US010827398B2

(12) United States Patent
Park et al.

(10) Patent No.: US 10,827,398 B2
(45) Date of Patent: Nov. 3, 2020

(54) COMMUNICATION NODE FOR PERFORMING HANDOVER IN WIRELESS COMMUNICATION SYSTEM AND METHOD THEREFOR

(71) Applicant: ELECTRONICS AND TELECOMMUNICATIONS RESEARCH INSTITUTE, Daejeon (KR)

(72) Inventors: Hyun Seo Park, Daejeon (KR); Eun Kyung Kim, Daejeon (KR); Tae Joong Kim, Daejeon (KR); An Seok Lee, Daejeon (KR); Yu Ro Lee, Daejeon (KR); Hyun Lee, Daejeon (KR); Hee Soo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/040,926

(22) Filed: Jul. 20, 2018

(65) Prior Publication Data

US 2019/0028938 A1   Jan. 24, 2019

(30) Foreign Application Priority Data

Jul. 24, 2017 (KR) .................. 10-2017-0093475
Jun. 27, 2018 (KR) .................. 10-2018-0073787

(51) Int. Cl.
*H04W 36/00* (2009.01)
*H04W 36/30* (2009.01)

(52) U.S. Cl.
CPC .. *H04W 36/0058* (2018.08); *H04W 36/00837* (2018.08); *H04W 36/30* (2013.01)

(58) Field of Classification Search
CPC . H04W 24/10; H04W 36/00; H04W 36/0016; H04W 36/0044; H04W 36/0055;
(Continued)

(56) References Cited

U.S. PATENT DOCUMENTS 8,886,193 B2 * 11/2014 Lindoff ............. H04W 36/0072
                                                              455/436
9,107,133 B2    8/2015 Catovic et al.
(Continued)

FOREIGN PATENT DOCUMENTS

WO    2008/131401 A1   10/2008
WO    2011/136565 A2   11/2011
(Continued)

*Primary Examiner* — Eric Nowlin
(74) *Attorney, Agent, or Firm* — LRK Patent Law Firm

(57) ABSTRACT

An operation method of a terminal includes receiving configuration information from a serving base station; measuring channel states of the serving base station and a target base station; when a difference between received signal strengths of the serving base station and the target base station is not less than a handover preparation offset, determining that a handover preparation event has occurred and transmitting a measurement report message to the serving base station; and when the difference is equal to or greater than a handover execution offset, determining that a handover execution event has occurred and transmitting a handover indication message informing of execution of a handover to the target base station. The channel state is normal state, abnormal state, or RLF state, and the configuration information indicates a different handover preparation offset and a different handover execution event according to the channel state.

4 Claims, 6 Drawing Sheets

(58) Field of Classification Search
CPC ......... H04W 36/0058; H04W 36/0083; H04W 36/00837; H04W 36/0085; H04W 36/0088; H04W 36/0094; H04W 36/08; H04W 36/16; H04W 36/24; H04W 36/30; H04W 36/32; H04W 36/34; H04W 48/20

See application file for complete search history.

(56) References Cited

U.S. PATENT DOCUMENTS

| | | | | |
|---|---|---|---|---|
| 9,414,290 | B2* | 8/2016 | Ueda | H04W 36/00837 |
| 9,544,828 | B2* | 1/2017 | Kitazoe | H04W 36/26 |
| 9,596,616 | B2* | 3/2017 | Jang | H04W 24/08 |
| 9,854,496 | B2* | 12/2017 | Johansson | H04W 36/30 |
| 9,961,607 | B2* | 5/2018 | Cui | H04W 36/36 |
| 10,721,654 | B2* | 7/2020 | Byun | H04W 36/14 |
| 2010/0173610 | A1* | 7/2010 | Kitazoe | H04W 12/04031 |
| | | | | 455/411 |
| 2014/0206330 | A1* | 7/2014 | Chen | H04W 24/10 |
| | | | | 455/418 |
| 2014/0248878 | A1* | 9/2014 | Wong | H04W 36/0061 |
| | | | | 455/436 |
| 2015/0092686 | A1* | 4/2015 | Cui | H04W 36/36 |
| | | | | 370/329 |
| 2015/0092746 | A1* | 4/2015 | Jang | H04W 24/08 |
| | | | | 370/331 |
| 2015/0249950 | A1* | 9/2015 | Teyeb | H04W 36/0016 |
| | | | | 455/437 |
| 2015/0264622 | A1* | 9/2015 | Ueda | H04W 36/00837 |
| | | | | 455/438 |
| 2015/0358864 | A1 | 12/2015 | Park et al. | |
| 2015/0373611 | A1* | 12/2015 | Liu | H04W 36/30 |
| | | | | 455/436 |
| 2016/0007243 | A1 | 1/2016 | Park et al. | |
| 2016/0174124 | A1* | 6/2016 | Basu Mallick | H04W 36/0072 |
| | | | | 370/331 |
| 2016/0192269 | A1 | 6/2016 | Kim et al. | |
| 2016/0302127 | A1* | 10/2016 | Moon | H04W 76/27 |
| 2017/0055192 | A1* | 2/2017 | Johansson | H04W 36/30 |
| 2019/0028938 | A1* | 1/2019 | Park | H04W 36/0058 |
| 2020/0022042 | A1* | 1/2020 | Yin | H04W 36/00837 |
| 2020/0068448 | A1* | 2/2020 | Byun | H04W 36/023 |

FOREIGN PATENT DOCUMENTS

| | | |
|---|---|---|
| WO | 2014/122706 A1 | 8/2014 |
| WO | 2015/050336 A1 | 4/2015 |
| WO | 2015/164712 A1 | 10/2015 |

* cited by examiner

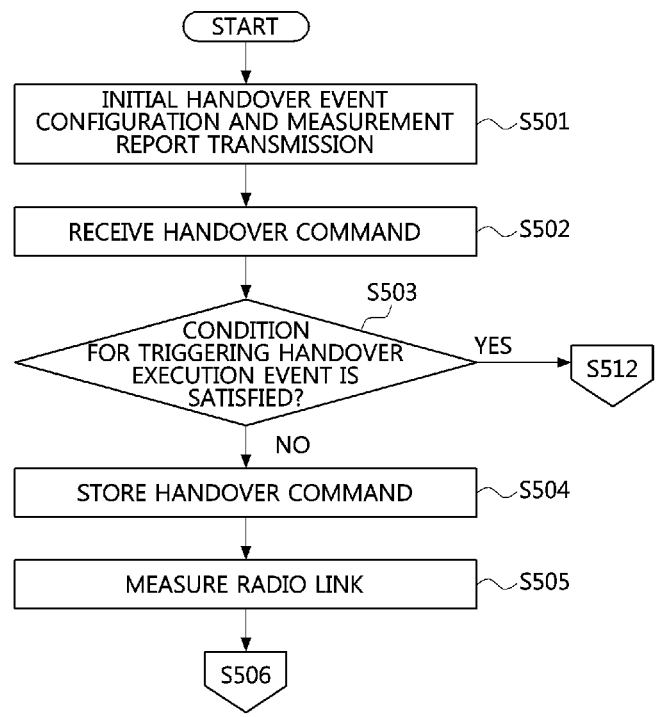

COMMUNICATION NODE FOR PERFORMING HANDOVER IN WIRELESS COMMUNICATION SYSTEM AND METHOD THEREFOR

CROSS-REFERENCE TO RELATED APPLICATIONS

This application claims priority to Korean Patent Application No. 10-2017-0093475, filed on Jul. 24, 2017, and Korean Patent Application No. 10-2018-0073787, filed on Jun. 27, 2018, in the Korean Intellectual Property Office (KIPO), the entire contents of which are hereby incorporated by reference.

BACKGROUND

1. Technical Field

The present disclosure relates to a communication node for performing handover in a wireless communication system, and an operation method for the same.

2. Description of Related Art

In a Long Term Evolution (LTE) based communication system, when a terminal moves from a cell of a serving base station to a cell of another base station, the terminal can perform a handover from the serving base station to another base station. For example, the terminal may measure received signal strengths of neighbor base stations, and report them to the serving base station by transmitting a measurement report message. The serving base station may prepare a target base station for handover based on the received signal strengths of the neighbor base stations reported from the terminal. After the serving base station completes the preparation for the target base station, the serving base station may transmit a handover command message for instructing the terminal to perform the handover. The terminal may then perform the handover to the target base station based on the handover command message received from the serving base station and access the target base station.

However, a state of a radio link with the serving base station may not be good in a temporal or spatial region in which the terminal performs the handover. For example, the serving base station may not receive the measurement report message including the received signal strengths of the neighbor base stations from the terminal in real time. Also, the terminal may not receive the handover command message from the serving base station in real time. Accordingly, a time during which data transmission and reception of the terminal are interrupted while the terminal performs the handover (i.e., data interruption time) may increase, thereby degrading a communication quality of the communication system.

The terminal may trigger a handover when the received signal strength of the target base station exceeds the received signal strength of the serving base station by a predetermined threshold. That is, if the received signal strength of the target base station does not exceed the received signal strength of the serving base station by the predetermined threshold even though the received signal strength of the serving base station is low, the terminal may not trigger the handover.

Meanwhile, a radio link failure (RLF) may occur between the terminal and the serving base station. In case that the RLF has occurred, the terminal may perform an operation of selecting a target base station to recover the RLF. In this case, the data transmission and reception of the terminal may also be interrupted for a time during which the terminal performs the operation of selecting the target base station, and the communication quality may be degraded.

The time during which the data transmission and reception are interrupted due to the handover may be 50 milliseconds. Also, a time during which data transmission and reception are interrupted due to an access stratum (AS) RLF recovery through re-establishment of the connection between the terminal and the base station may be several hundreds of milliseconds. Also, a time during which data transmission and reception are interrupted due to a non-access stratum (NAS) RLF recovery through an initial access after failure of the AS RLF recovery may be a few seconds. Therefore, in case that an RLF has occurred due to a handover failure, the AS RLF recovery is performed, or the NAS RLF recovery is performed due to the failure of the AS RLF recovery, the communication quality may be deteriorated due to the data interruption for a long period of time.

SUMMARY

Accordingly, embodiments of the present disclosure provide a communication node for performing an enhanced handover which reduces a data interruption time and reduces occurrences of a radio link failure in a wireless communication system, and an operation method thereof.

In order to achieve the objective of the present disclosure, an operation method of a terminal in a wireless communication system, the operation method comprising receiving a configuration information of handover events from a serving base station; measuring channel states of the serving base station and a target base station; in response to determining that a difference between received signal strengths of the serving base station and the target base station is equal to or greater than a handover preparation offset indicated by the configuration information according to the measured channel states, determining that a handover preparation event has occurred and transmitting a measurement report message to the serving base station according to the occurrence of the handover preparation event; and in response to determining that the difference is equal to or greater than a handover execution offset indicated by the configuration information according to the measured channel states, determining that a handover execution event has occurred and transmitting a handover indication message informing of execution of a handover to the target base station according to the occurrence of the handover execution event. Also, the channel state may indicate a normal state, an abnormal state, or a radio link failure (RLF) state, and the configuration information may indicate a different handover preparation offset and a different handover execution event according to the channel state.

The configuration information may include a first handover preparation offset and a first handover execution offset for triggering handover events in the normal state in which the received signal strength of the serving base station is equal to or greater than a predetermined threshold, a second handover preparation offset and a second handover execution offset for triggering handover events in the abnormal state in which the received signal strength of the serving base station is less than the predetermined threshold, and a third handover execution offset for triggering handover events in the RLF state in which an RLF occurs with the serving base station. Also, the first handover preparation offset may have a value greater than the second handover preparation offset, the first handover execution offset may have a value greater than the second handover execution offset, and the second handover execution offset may have a value greater than the third handover execution offset.

The operation may further comprise, after the measuring, receiving a handover command message for the target base station from the serving base station.

The handover preparation event may be determined to have occurred when the channel state of the serving base station is in the normal state and the difference is equal to or greater than the first handover preparation offset, and the handover execution event may be determined to have occurred when the difference is greater than or equal to the first handover execution offset.

The handover preparation event may be determined to have occurred when the channel state of the serving base station is in the abnormal state and the difference is greater than or equal to the second handover preparation offset, and the handover execution event may be determined to have occurred when the difference is greater than or equal to the second handover execution offset.

The operation method may further comprise executing the handover to the target base station based on the handover command message.

The handover may be executed regardless of receipt of a handover indication response message for the handover indication message.

The operation method may further comprise performing a cell selection operation when the channel state of the serving base station is in the RLF state, wherein the handover execution event may be determined to have occurred according to a result of the cell selection operation when the difference is greater than or equal to the third handover execution offset, and the handover may be executed when the handover command message for the target base station is determined to have been stored in advance.

In order to achieve the objective of the present disclosure, an operation method of a base station in a wireless communication system may comprise transmitting a configuration information of handover events to a terminal; receiving a measurement report message for a target base station from the terminal; preparing a handover of the terminal based on the measurement report message and transmitting a handover command message to the terminal; receiving from the terminal a handover indication message informing in advance of execution of the handover to the target base station; and transmitting a handover indication response message to the terminal in response to the handover indication message. Also, the measurement report message may be transmitted from the terminal when a handover preparation event indicated by the configuration information is determined to have occurred, and the handover indication message may be transmitted from the terminal when a handover execution event indicated by the configuration information is determined to have occurred.

The measurement report message may be transmitted by the terminal when a difference between a received signal strength of the serving base station and a received signal strength of the target base station is greater than or equal to a handover preparation offset indicated by the configuration information.

The handover indication message may be transmitted by the terminal when a difference between a received signal strength of the serving base station and a received signal strength of the target base station is greater than or equal to a handover execution offset indicated by the configuration information.

The configuration information may include a first handover preparation offset and a first handover execution offset for triggering handover events in a normal state in which a received signal strength of the serving base station is equal to or greater than a predetermined threshold, a second handover preparation offset and a second handover execution offset for triggering handover events in an abnormal state in which the received signal strength of the serving base station is less than the predetermined threshold, and a third handover execution offset for triggering handover events in a radio link failure (RLF) state in which an RLF occurs with the serving base station. Also, the first handover preparation offset may have a value greater than the second handover preparation offset, the first handover execution offset may have a value greater than the second handover execution offset, and the second handover execution offset may have a value greater than the third handover execution offset.

In order to achieve the objective of the present disclosure, a terminal in a wireless communication system may comprise a processor, a memory storing at least one instruction executed by the processor, and a transceiver controlled by the processor. Also, the at least one instruction may be configured to receive a configuration information of handover events from a serving base station through the transceiver; measure channel states of the serving base station and a target base station; in response to determining that a difference between received signal strengths of the serving base station and the target base station is equal to or greater than a handover preparation offset indicated by the configuration information according to the measured channel states, determine that a handover preparation event has occurred and transmit a measurement report message to the serving base station according to the occurrence of the handover preparation event through the transceiver; and in response to determining that the difference is equal to or greater than a handover execution offset indicated by the configuration information according to the measured channel states, determine that a handover execution event has occurred and transmit a handover indication message informing of execution of a handover to the target base station according to the occurrence of the handover execution event through the transceiver. Also, the channel state may indicate a normal state, an abnormal state, or a radio link failure (RLF) state, and the configuration information may indicate a different handover preparation offset and a different handover execution event according to the channel state.

The configuration information may include a first handover preparation offset and a first handover execution offset for triggering handover events in the normal state in which the received signal strength of the serving base station is equal to or greater than a predetermined threshold, a second handover preparation offset and a second handover execution offset for triggering handover events in the abnormal state in which the received signal strength of the serving base station is less than the predetermined threshold, and a third handover execution offset for triggering handover events in the RLF state in which an RLF occurs with the serving base station. Also, the first handover preparation offset may have a value greater than the second handover preparation offset, the first handover execution offset may have a value greater than the second handover execution offset, and the second handover execution offset may have a value greater than the third handover execution offset.

The at least one instruction may be further configured to receive a handover command message for the target base station from the serving base station through the transceiver.

The handover preparation event may be determined to have occurred when the channel state of the serving base station is in the normal state and the difference is equal to or greater than the first handover preparation offset, and the handover execution event may be determined to have occurred when the difference is greater than or equal to the first handover execution offset.

The handover preparation event may be determined to have occurred when the channel state of the serving base station is in the abnormal state and the difference is greater than or equal to the second handover preparation offset, and the handover execution event may be determined to have occurred when the difference is greater than or equal to the second handover execution offset.

The at least one instruction may be further configured to execute the handover to the target base station based on the handover command message.

The handover may be executed regardless of receipt of a handover indication response message for the handover indication message.

The at least one instruction may be further configured to perform a cell selection operation when the channel state of the serving base station is in the RLF state, and the handover execution event may be determined to have occurred according to a result of the cell selection operation when the difference is greater than or equal to the third handover execution offset, and the handover may be executed when the handover command message for the target base station is determined to have been stored in advance.

According to the embodiments of the present disclosure, the terminal can configure different handover execution values according to whether the received signal strength of the serving base station is equal to or greater than a predetermined threshold, and thus a handover can be performed faster than a conventional scheme according to the state of the radio link with the serving base station, thereby reducing the data interruption time and reducing the occurrence of the RLF.

Also, according to the embodiments of the present disclosure, when it is determined that the RLF has occurred, if a target base station having a received signal strength greater than the received signal strength of the serving base station is present, the terminal may execute a handover to the selected target base station, without performing an AS RLF recovery procedure, so that the occurrence of the RLF can be prevented, and the data interruption time can also be reduced.

BRIEF DESCRIPTION OF DRAWINGS

Embodiments of the present disclosure will become more apparent by describing in detail embodiments of the present disclosure with reference to the accompanying drawings, in which:

FIGS. 5A to 5C are flow charts illustrating an operation method of a terminal performing a handover in a wireless communication system according to a second embodiment of the present disclosure.

DETAILED DESCRIPTION

Figure 1:
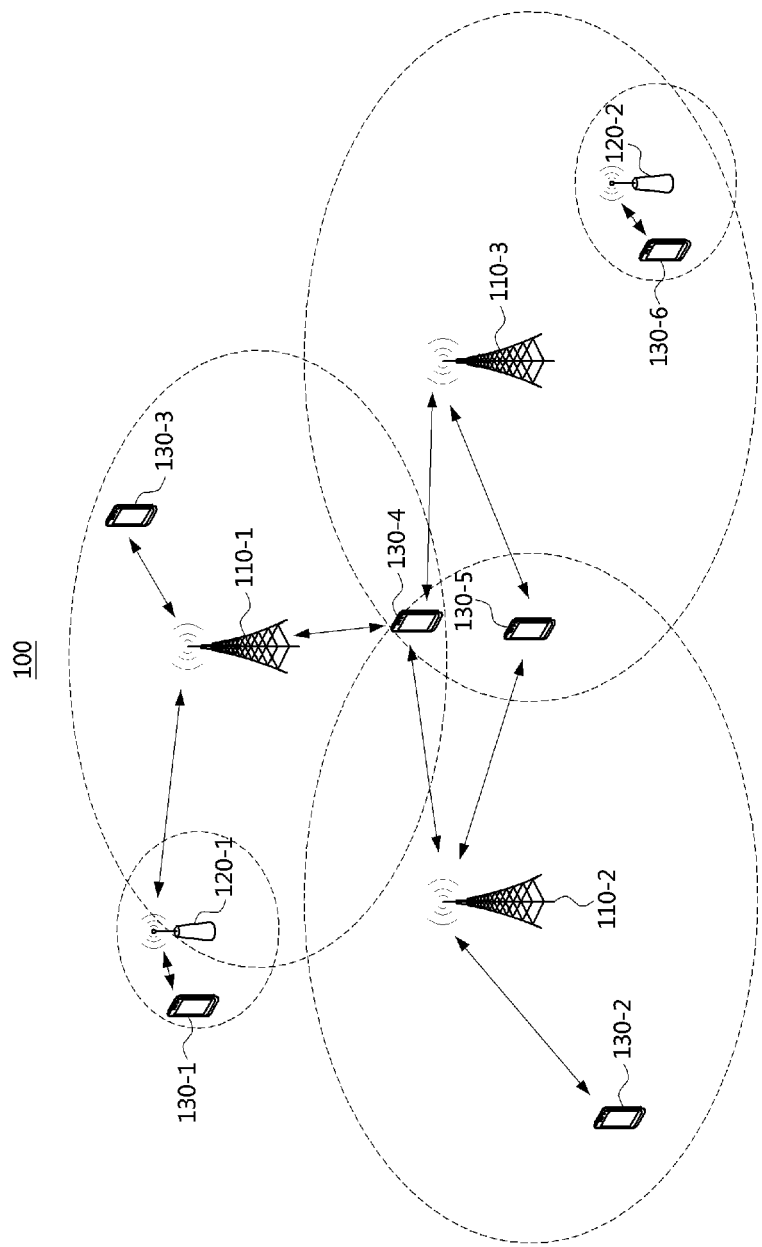
FIG. 1 is a conceptual diagram a wireless communication system according to a first embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Throughout the specification, a terminal may be a mobile terminal (MT), a mobile station (MS), an advanced mobile station (AMS), a high reliability mobile station (HR-MS), a subscriber station (SS), a portable subscriber station (PSS), an access terminal (AT), an user equipment (UE), or the like. Also, the terminal may include all or a part of functions of MS, AMS, HR-MS, SS, PSS, AT, UE, or the like.

Also, a base station may be an advanced base station (ABS), a high reliability base station (HR-BS), a node B, an evolved node B (eNB), an access point (AP), a radio access station (RAS), a base transceiver station (BTS), a mobile multi-hop relay (MMR)-BS, a relay station (RS), a high reliability relay station (HR-RS) or a small cell base station performing a role of the base station, or the like. Also, the base station may include all or a part of functions of ABS, HR-BS, node B, eNB, AP, RAS, BTS, MMR-BS, RS, HR-RS, small cell base station, or the like.

FIG. 1 is a conceptual diagram a wireless communication system according to a first embodiment of the present disclosure.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
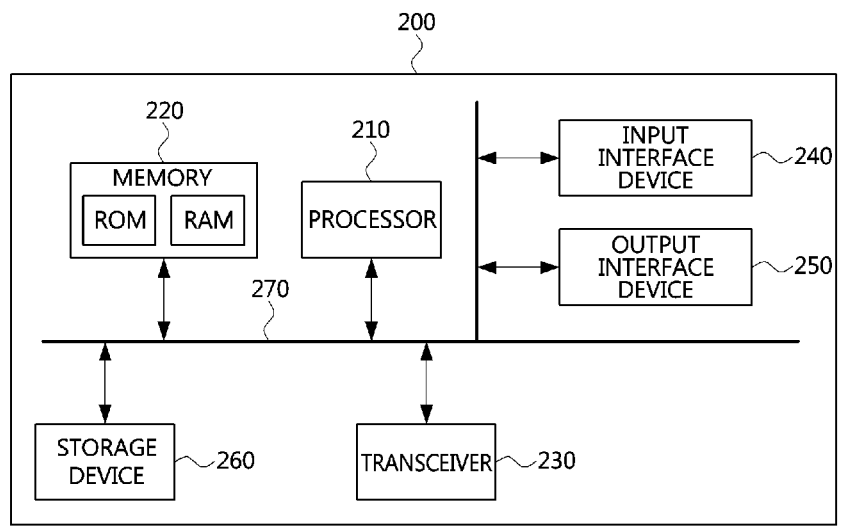
FIG. 2 is a block diagram illustrating a communication node in a wireless communication system according to a first embodiment of the present disclosure.

FIG. 2 is a block diagram illustrating a communication node in a wireless communication system according to a first embodiment of the present disclosure.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Figure 3:
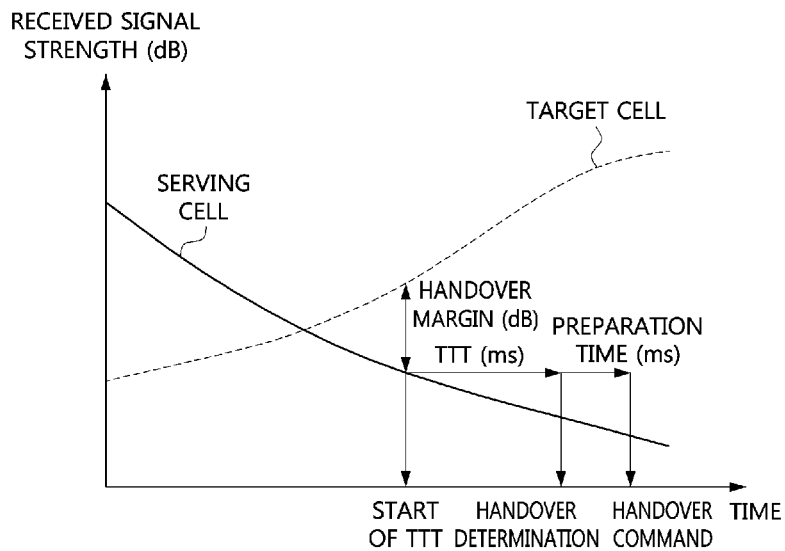
FIG. 3 is a conceptual diagram illustrating a time point at which a terminal performs a handover based on a received signal strength of a serving base station and a received signal strength of a target base station in a wireless communication system according to a first embodiment of the present disclosure.

FIG. 3 is a conceptual diagram illustrating a time point at which a terminal executes a handover based on a received signal strength of a serving base station and a received signal strength of a target base station in a wireless communication system according to a first embodiment of the present disclosure.

Referring to FIG. 3, in a wireless communication system, a terminal may measure a received signal strength of a serving base station covering a serving cell and received signal strengths of neighbor base stations including a target base station covering a target cell. For example, the terminal may measure a reference signal received power (RSRP) of each of the neighbor base stations.

Here, the wireless communication system may be the same as or similar to the wireless communication system 100 of FIG. 1. Also, a structure of each of the terminal, the serving base station, and the target base station may be the same as or similar to the structure of the communication node 200 in FIG. 2.

The terminal may determine whether a state in which a difference between the received signal strengths of the target base station and the serving base station is greater than or equal to a handover margin (HOM) is maintained for a predetermined time. For example, if the difference between the received signal strengths is greater than or equal to the HOM during a predetermined time to trigger (TTT), the terminal may transmit a measurement report message to the serving base station. Here, the measurement report message may include channel state information on the received signal strength of each of the serving base station and the neighbor base stations. The HOM may be a first offset of an A3 event. The A3 event may mean a state in which a received signal strength of a neighbor base station is greater than the received signal strength of the serving base station by the first offset or more.

The serving base station may receive the measurement report message from the terminal. The serving base station may determine a handover of the terminal based on the received signal strengths of the serving base station and the neighbor base stations included in the measurement report message. At this time, the serving base station may transmit a handover preparation message to the target base station to which the terminal is to handover. The target base station may then receive the handover preparation message from the serving base station. The target base station may determine whether to accept the handover of the terminal based on the handover preparation message. The target base station may transmit to the serving base station a handover preparation response message including information indicating whether to accept the handover of the terminal.

The serving base station may receive the handover preparation response message from the target base station. When the handover preparation response message includes the information indicating that the handover of the terminal is accepted, the serving base station may transmit to the terminal a handover command message instructing the handover. Here, the handover command message may be a radio resource control (RRC) connection reconfiguration message.

After determining the handover of the terminal, the serving base station may transmit the handover command message to the terminal. At this time, a state of a radio link between the serving base station and the terminal may not be good in a handover region where the terminal is located. Accordingly, the serving base station may not receive the measurement report message transmitted from the terminal in real time. Also, the terminal may not be able to receive the handover command message transmitted from the serving base station in real time. Accordingly, the handover may fail depending on the state of the radio link between the terminal and the serving base station. Accordingly, if a handover failure occurs while the terminal performs the handover operation, a time during which data transmission and reception of the terminal are interrupted (i.e., data interruption time) may increase, and a communication quality may be degraded.

Meanwhile, if the received signal strength of the serving base station is less than $Q_{out}$, the terminal may start a T310 timer. Here, $Q_{out}$ is defined as a received signal strength value for a case when a control channel decoding error occurs at 10% or more, and in the LTE standard, the case may be defined as a state that a signal to interference noise ratio (SINR) is −8 dB. The T310 timer is a timer for determining an RLF. If the received signal strength of the serving base station becomes equal to or greater than $Q_{in}$ after the T310 timer is started, the terminal may stop the T310 timer. In this case, $Q_{in}$ may be an SINR of −6 dB. If the received signal strength of the serving base station is less than $Q_{in}$, the T310 timer may expire. The terminal may determine that the RLF has occurred when the T310 timer expires, and perform an RLF recovery procedure when it is determined that the RLF has occurred.

For example, in the case that the RLF has occurred, the terminal may select a base station having the best channel state among base stations to which the terminal can connect through cell selection. Here, the terminal may perform a re-establishment procedure for re-establishing a connection to the selected base station.

Here, the terminal may be able to resume communication through the connection re-establishment and recovery procedure only when the selected cell is a cell of the serving base station or a cell of the target base station prepared for handover. In case that the terminal selects a cell other than the cell of the serving base station or the cell of the target base station prepared for handover, the connection re-establishment may fail. At this time, the terminal may perform a network connection procedure again from the beginning. In this case, the data interruption time may last more than one second, and thus the communication quality of the terminal may be degraded.

Figure 4:
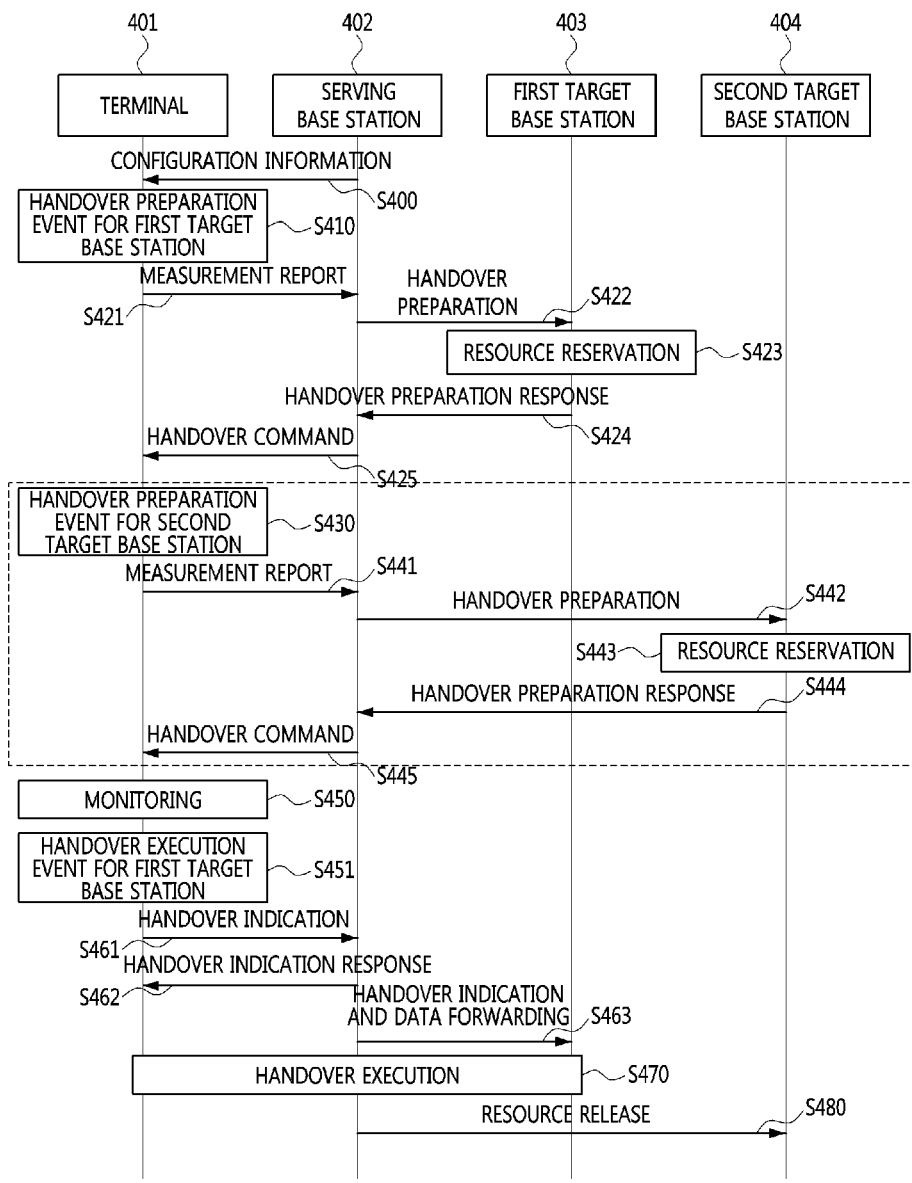
FIG. 4 is a sequence chart illustrating a signal flow between a terminal, a serving base station, and a plurality of target base stations for performing handover in a wireless communication system according to a first embodiment of the present disclosure.

FIG. 4 is a sequence chart illustrating a signal flow between a terminal, a serving base station, and a plurality of target base stations for performing handover in a wireless communication system according to a first embodiment of the present disclosure.

Referring to FIG. 4, a wireless communication system may include a terminal 401, a serving base station 402, a first target base station 403, and a second target base station 404. Here, the wireless communication system may be the same as or similar to the wireless communication system of FIG. 3. Also, the terminal 401 may operate in the same or similar manner as the terminal of FIG. 3. Also, the serving base station 402 may operate in the same or similar manner as the serving base station in FIG. 3. Also, each of the first target base station 403 and the second target base station 404 may operate in the same or similar manner as the target base station in FIG. 3.

The serving base station 402 may transmit configuration information to the terminal 401 (S400). The terminal 401 may receive the configuration information from the serving base station 402. Here, the configuration information may be configuration information of handover events (hereinafter, also referred to as 'handover configuration information').

The configuration information may include information indicating a first handover preparation offset and a first handover execution offset for a first handover event triggered when the received signal strength of the serving base station is equal to or greater than a predetermined threshold. Also, the configuration information may include information indicating a second handover preparation offset and a second handover execution offset for a second handover event triggered when the received signal strength of the serving base station is less than the predetermined threshold. Also, the configuration information may include information indicating a third handover execution offset for a third handover event triggered when an RLF occurs with the serving base station. The first handover execution offset may have a value greater than the second handover execution offset. The second handover execution offset may have a value greater than the third handover execution offset.

The terminal 401 may determine whether to trigger a handover preparation event for the first target base station 403 (S410). For example, when a difference between the received signal strength of the serving base station 402 and the received signal strength of the first target base station 403 is equal to or greater than a handover preparation offset, the terminal 401 may determine that the handover preparation event for the first target base station 403 has occurred. Here, the handover preparation offset may be configured differently according to a state of a radio link between the terminal and the serving base station. For example, according to the state of the radio link between the terminal and the serving base station, the handover preparation offset may be one of the first handover preparation offset and the second handover preparation offset. This will be described later in further detail.

The terminal 401 may transmit a measurement report message including information on the received signal strength of the first target base station 403 to the serving base station 402 (S421). The serving base station 402 may receive the measurement report message from the terminal 401.

The serving base station 402 may transmit a handover preparation message to the first target base station 403 based on the measurement report message received from the terminal 401 (S422). The first target base station 403 may receive the handover preparation message from the serving base station 402.

The first target base station 403 may reserve resources for the terminal 401 based on the handover preparation message received from the serving base station 402 (S423).

The first target base station 403 may then transmit a handover preparation response message to the serving base station 402 (S424). The handover preparation response message may be a response message responsive to the handover preparation message. The handover preparation response message may include a message indicating that resources for the terminal 401 have been reserved. The serving base station 402 may receive the handover preparation response message from the first target base station 403.

The serving base station 402 may transmit a handover command message to the terminal 401 based on the handover preparation response message received from the first target base station 403 (S425). The terminal 401 may receive the handover command message from the serving base station 402.

Similarly, the terminal 401 may determine whether to trigger a handover preparation event for the second target base station 404 (S430). For example, when a difference between the received signal strength of the serving base station 402 and the received signal strength of the second target base station 404 is equal to or greater than the handover preparation offset, the terminal 401 may determine that the handover preparation event for the second target base station 404 has occurred.

The terminal 401 may transmit a measurement report message including information on the received signal strength of the second target base station 404 to the serving base station 402 (S441). The serving base station 402 may receive the measurement report message from the terminal 401.

The serving base station 402 may transmit a handover preparation message to the second target base station 404 based on the measurement report message received from the terminal 401 (S442). The second target base station 404 may receive the handover preparation message from the serving base station 402.

The second target base station 404 may reserve resources for the terminal 401 based on the handover preparation message received from the serving base station 402 (S443).

The second target base station 404 may then transmit a handover preparation response message to the serving base station 402 (S444). The handover preparation response message may be a response message responsive to the handover preparation message. The handover preparation response message may include a message indicating that resources for the terminal 401 have been reserved. The serving base station 402 may receive the handover preparation response message from the second target base station 404.

The serving base station 402 may transmit a handover command message to the terminal 401 based on the handover preparation response message received from the second target base station 404 (S445). The terminal 401 may receive the handover command message from the serving base station 402.

Then, the terminal 401 may monitor the received signal strengths of the serving base station 402 and the plurality of target base stations 403 and 404 (S450). That is, the terminal 401 may not execute a handover immediately after receiving the at least one handover command message from the serving base station 402. For example, when the terminal 401 receives the plurality of handover command messages from the serving base station 402 (S425 and S445), the terminal 401 may determine a handover execution time and a target base station to which the terminal is actually to handover, based on a result of comparing the received signal strength of each of the plurality of target base stations 403 and 404 with the received signal strength of the serving base station 402.

For example, the terminal 401 may determine whether there is a target base station having a difference in received signal strength with the serving base station 402 that is equal to or greater than a handover execution offset, among the plurality of target base stations 403 and 404. Here, the handover execution offset may be configured differently according to the state of the radio link between the terminal and the serving base station. For example, according to the state of the radio link between the terminal and the serving base station, the handover execution offset may be one of the first handover execution offset, the second handover execution offset, and the third handover execution offset. This will be described later in further detail.

For example, when the difference between the received signal strength of the first target base station 403 and the received signal strength of the serving base station 402 is equal to or greater than the handover execution offset, the terminal 401 may determine that a handover execution event for the first target base station 403 has occurred (S451). The terminal 401 may determine a time point at which the handover to the first target base station 403 is to be executed when the handover execution event is determined to have occurred. Also, when the handover execution event for the first target base station 403 is determined to have occurred, the terminal 401 may determine the first target base station 403 as a target base station to which the terminal 401 is actually to handover among the plurality of target base stations 403 and 404.

In case that the handover execution event for the first target BS 403 occurs, the terminal 401 may transmit to the serving base station 402 a handover indication message indicating that a handover to the first target base station 403 is to be executed (S461). The serving base station 402 may receive the handover indication message from the terminal 401.

The serving base station 402 may transmit a handover indication response message to the terminal 401 based on the handover indication message received from the terminal 401 (S462). The terminal 401 may receive the handover indication response message from the serving base station 402.

The serving base station 402 may transfer the handover indication message received from the terminal 401 to the first target base station 403 (S463). Here, the serving base station 402 may transfer data to be transmitted to the terminal 401 to the first target base station 403 together with the handover indication message.

The terminal 401 may execute the handover to the first target base station 403 (S470). The first target base station 403 may be connected to the terminal 401 in accordance with the handover of the terminal 401.

After transmitting the handover indication message to the first target base station 403, the serving base station 402 may transmit to the second target base station 404 a resource release message requesting to release the resources reserved for the terminal 401 (S480). The second target base station 404 may receive the resource release message from the serving base station 402. The second target base station 404 may release the resources reserved for the terminal 401 based on the resource release message received from the serving base station 402.

Figure 5B:
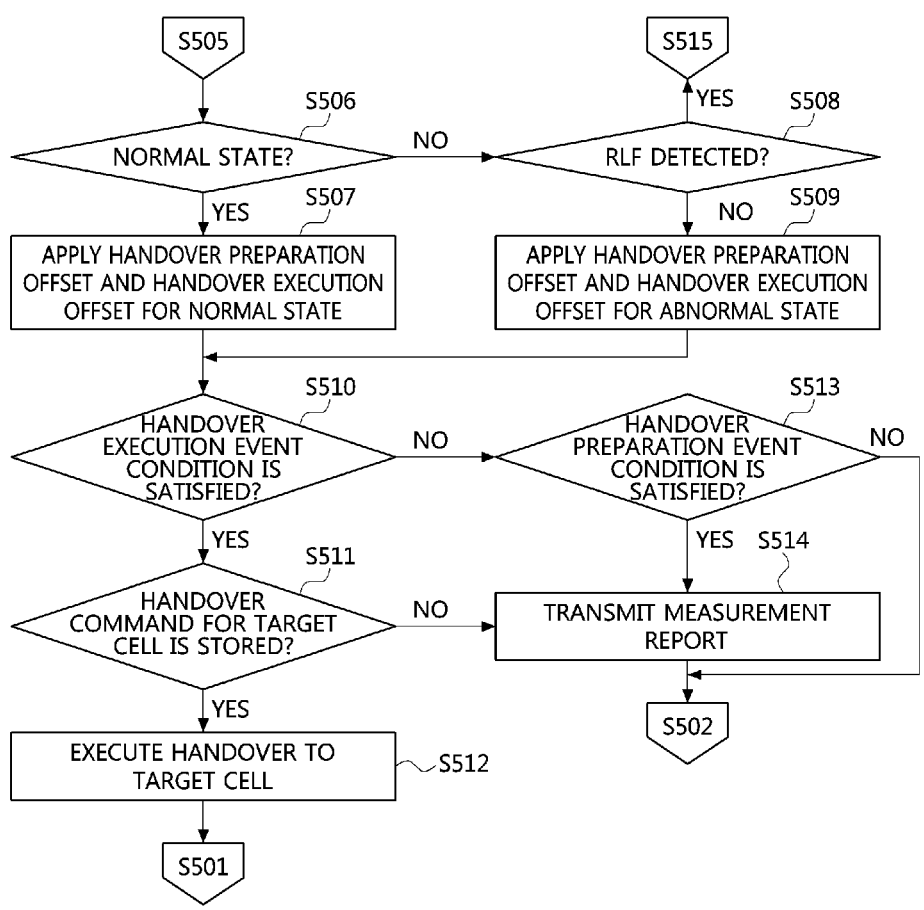
Figure 5C:
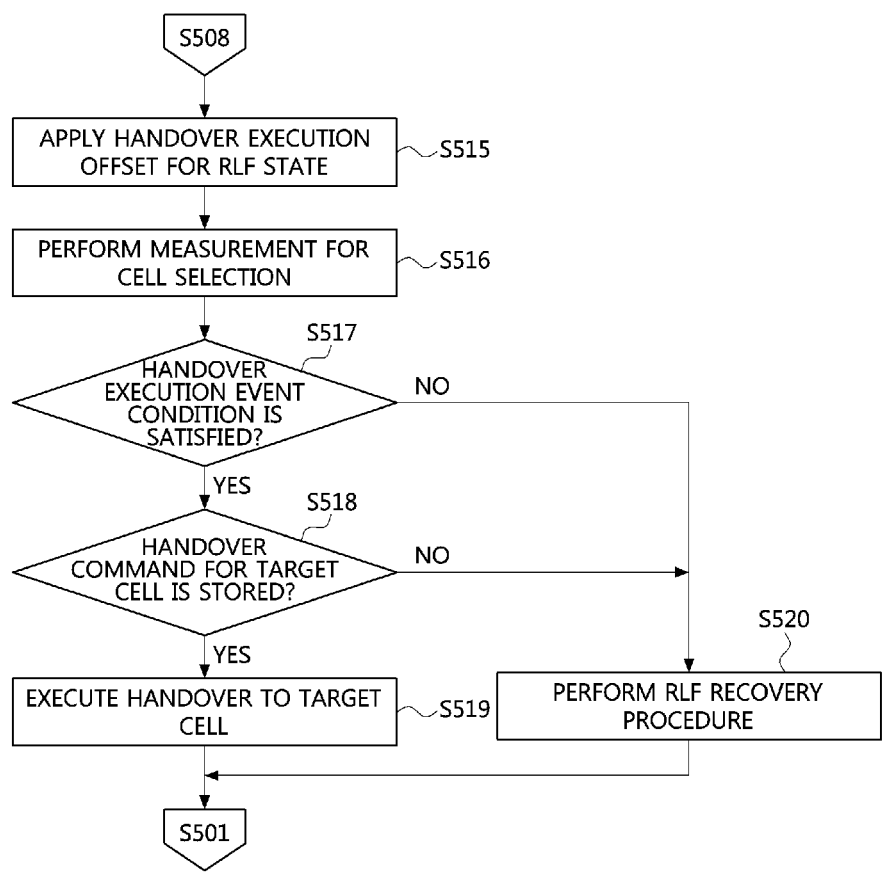

FIGS. 5A to 5C are flow charts illustrating an operation method of a terminal performing a handover in a wireless communication system according to a second embodiment of the present disclosure.

Referring to FIG. 5A, in the wireless communication system, the terminal may perform an initial handover event configuration and an operation of a measurement report transmission (S501). For example, the terminal may be connected to the serving base station, and the serving base station may transmit the configuration information of handover events (i.e., the configuration information described in FIG. 4) to the terminal. That is, the terminal may receive the configuration information from the serving base station. The terminal may configure the handover events based on the configuration information received from the serving base station. The handover events may include a handover preparation event and a handover execution event. For example, the terminal may set a handover preparation offset and a handover execution offset to initial values based on the configuration information.

Here, the wireless communication system may be the same as or similar to the wireless communication system of FIG. 4. Also, the terminal may operate in the same or similar manner as the terminal 401 in FIG. 4. Also, each of a first target base station and a neighbor base station below may operate in the same or similar manner as the first target base station 403 or the second target base station 404 in FIG. 4.

When a handover preparation event occurs based on the configuration of handover events, the terminal may transmit a measurement report message to the serving base station. For example, when a difference between a received signal strength of the serving base station and a received signal strength of the target base station is greater than or equal to the handover preparation offset, the terminal may determine that the handover preparation event has occurred. Here, the terminal may transmit the measurement report message including channel state information on the received signal strength of the target base station to the serving base station.

The configuration information may include a first handover preparation offset and a first handover execution offset used for determining each of a handover preparation event and a handover execution event triggered when a radio link with the serving base station is in normal state. The terminal may determine that the radio link with the serving base station is in normal state when the received signal strength of the serving base station is equal to or greater than a predetermined threshold.

Also, the configuration information may further include a second handover preparation offset and a second handover execution event used for determining each of a handover preparation event and a handover execution event triggered when the radio link with the serving base station is in abnormal state. The terminal may determine that the radio link with the serving base station is in abnormal state when the received signal strength of the serving base station is less than the predetermined threshold.

Also, the configuration information may further include a third handover execution offset used for determining a handover execution event triggered when an RLF with the serving base station occurs (i.e., RLF state).

Here, the first preparation offset may be greater than the second preparation offset. The first execution offset may be greater than the second execution offset. The second execution offset may be greater than the third execution offset.

For example, the first and second handover preparation offsets and the first to third handover execution offsets may be configured as shown in Table 1 below.

TABLE 1

| | Handover preparation offset | Handover execution offset |
|---|---|---|
| Normal radio link state | A3 offset 2 dB | A3 offset 5 dB |
| Abnormal radio link state | A3 offset 1 dB | A3 offset 3 dB |
| RLF state | — | A3 offset 0 dB |

The terminal may determine that the handover preparation event or the handover execution event has occurred when the received signal strength of the target base station is greater than the received signal strength of the serving base station by a specific offset. For example, the wireless communication system according to an embodiment of the present disclosure may be an LTE based system. Here, the terminal may use a measurement event A3 of the LTE based system as the handover execution event and the handover preparation event. Also, the terminal may use other measurement events in addition to the measurement event A3. In general, an offset for the handover execution event may have a value greater than an offset for the handover preparation event.

Based on the handover configuration information received from the serving base station, the terminal may determine the occurrence of the handover preparation event or the handover execution event according to the radio link state or the RLF state with the serving base station.

For example, when the difference between the received signal strength of the first target base station and the received signal strength of the serving base station is greater than or equal to the handover preparation offset, the terminal may determine that the handover preparation event has occurred. The terminal may transmit a measurement report message to the serving base station when the handover preparation event is determined to have occurred. The measurement report message may include channel state information including information on the received signal strength of the first target base station measured by the terminal. The serving base station may receive the measurement report message from the terminal.

The serving base station may transmit a handover preparation message to the first target base station based on the measurement report message received from the terminal. The first target base station may receive the handover preparation message from the serving base station.

The first target base station may then transmit a handover preparation response message to the serving base station based on the handover preparation message received from the serving base station. The serving base station may receive the handover preparation response message from the first target base station. The serving base station may transmit a handover command message to the terminal based on the handover preparation response message from the first target base station. The terminal may receive the handover command message from the serving base station (S502).

The terminal may determine whether the handover execution event for the first target base station has occurred (S503). For example, the terminal may determine whether the difference between the received signal strength of the first target base station and the received signal strength of the serving base station is equal to or greater than the preconfigured handover execution offset for a predetermined time. If the difference between the received signal strength of the first target base station and the received signal strength of the serving base station is greater than or equal to the preconfigured handover execution offset for the predetermined time, the terminal may determine that the handover execution event for the first target base station has occurred. At this time, the terminal may execute the handover to the first target base station based on the handover command message received from the serving base station (S512).

On the other hand, if the difference between the received signal strength of the first target base station and the received signal strength of the serving base station is less than the handover execution offset for the predetermined time, the terminal may determine that the handover execution event for the first target base station has not occurred. At this time, the terminal may store the handover command message received from the serving base station (S504). Then, the terminal may perform measurement on the radio link with the serving base station (S505).

Referring to FIG. 5B, the terminal may determine whether the radio link with the serving base station is in normal state (S506). For example, if the received signal strength of the serving base station is greater than or equal to a predetermined threshold, the terminal may determine that the radio link with the serving base station is in normal state.

The terminal may apply a handover preparation offset and a handover execution offset for the normal state (S507). For example, the terminal may configure the first handover preparation offset as a handover preparation event triggering value for the case that the radio link is in normal state, based on the handover configuration information received from the serving base station. Accordingly, when the radio link is in normal state, if the difference between the received signal strength of the serving base station and the received signal strength of the target base station is equal to or greater than the first handover preparation offset for a predetermined time, the terminal may determine that the handover preparation event for the first target base, station has occurred.

Also, the terminal may configure the first handover execution offset as a handover execution event triggering value for the case that the radio link is in normal state, based on the handover configuration information received from the serving base station. Accordingly, when the radio link is in normal state, if the difference between the received signal strength of the serving base station and the received signal strength of the target base station is equal to or greater than the first handover execution offset for a predetermined time, the terminal may determine that the handover execution event for the first target base station, has occurred.

On the other hand, when it is determined that the radio link with the serving base station is in abnormal state in the step S506, the terminal may proceed to a step S508. For example, if the received signal strength of the serving base station is less than the predetermined threshold, the terminal may determine that the radio link with the serving base station is in the abnormal state. Here, the received signal strength of the serving base station may refer to a reference signal received quality (RSRQ) or a reference signal received power (RSRP).

Also, if the RLF timer operates due to a problem in the radio link, the terminal may determine that the radio, link with the serving base station is in abnormal state. Here, the RLF timer may be the T310 timer of the LTE based system.

Here, the terminal may determine whether an RLF with the serving base station, has occurred (S508). When it is determined that an RLF with the serving base station has occurred, the terminal may proceed to a step S515.

When it is determined that an RLF with the serving base station has not occurred, the terminal may apply the handover preparation offset and the handover execution offset for the abnormal state (S509). For example, the terminal may configure the second handover preparation offset as a handover preparation event triggering value for the case that the radio link is in abnormal state, based on the handover configuration information received from the serving base station. Accordingly, when the radio link with the serving base station is in abnormal state, if the difference between the received signal strength of the serving base station and the received signal strength of the target base station is equal to or greater than the second handover preparation offset for a predetermined time, the terminal may determine that the handover preparation event for the first target base station has occurred.

Also, the terminal may configure the second handover execution offset as a handover execution event triggering value for the case that the radio link is in abnormal state, based on the handover configuration information received from the serving base station. If the difference between the received signal strength of the serving base station and the received signal strength of the target base station is equal to or greater than the second handover execution offset for a predetermined time, the terminal may detect that the handover execution event for the first target base station has occurred.

The terminal may determine whether a condition for triggering the handover execution event is satisfied (S510). For example, if the radio link with the serving base station is in normal state, the terminal may determine whether the difference between the received signal strength of the serving base station and the received signal strength of the first target base station is equal to or greater than the first handover execution offset. Also, when the radio link with the serving base station is in normal state, the terminal may determine whether the difference between the received signal strength of the serving base station and the received signal strength of the first target base station is equal to or greater than the second handover execution offset.

When the condition for triggering the handover execution event is satisfied, the terminal may determine whether a handover command message for the first target base station has been stored (S511). For example, if the difference between the received signal strength of the serving base station and the received signal strength of the first target base station is equal to or greater than the first handover execution offset in the normal state of the radio link with the serving base station, the terminal may determine whether the handover command message for the first target base station has been stored. Also, if the difference between the received signal strength of the serving base station and the received signal strength of the first target base station is equal to or greater than the second handover execution offset in the abnormal state of the radio link with the serving base station, the terminal may whether the handover command message for the first target base station has been stored.

In case that the handover command message for the first target base station has been stored, the terminal may execute the handover to the first target base station (S512). On the other hand, in case that the handover command message for the first target base station has not been stored, the terminal may transmit a measurement report message including channel state information on the received signal strength of the first target base station to the serving base station (S514).

When the condition for triggering the handover execution event is not satisfied in the step S510, the terminal may determine whether a condition for triggering the handover preparation event is satisfied (S513). For example, if the difference between the received signal strength of the serving base station and the received signal strength of the first target base station is equal to or greater than the first handover preparation offset in the normal state of the radio link with the serving base station, the terminal may determine that the condition for triggering the handover preparation event is satisfied. Also, if the difference between the received signal strength of the serving base station and the received signal strength of the first target base station is equal to or greater than the second handover preparation offset in the abnormal state of the radio link with the serving base station, the terminal may determine that the condition for triggering the handover preparation event is satisfied.

When the condition for triggering the handover preparation event is satisfied, the terminal may transmit a measurement report message to the serving base station (S514). For example, when the condition for triggering the handover preparation event for the first target base station is satisfied, the terminal may transmit a measurement report message including channel state information on the received signal strength of the first target base station to the serving base station. At this time, if the radio link with the serving base station is in abnormal state, the terminal may shorten a periodicity of measuring received signal strengths in order to cope with changes of radio link states. That is, the terminal may transmit the measurement report message to the serving base station with a short periodicity when the radio link with the serving base station is in abnormal state.

The serving base station may receive the measurement report message from the terminal. After transmitting the measurement report message to the serving base station, the terminal may return to the step S502.

Referring to FIG. 5C, if the terminal detects the RLF for the serving base station in the step S508, the terminal may apply a handover execution offset for the RLF state (S515). For example, the terminal may configure the third handover execution offset indicated by the handover configuration information received from the serving base station as a value for triggering the handover execution event in the RLF state.

Then, the terminal may perform measurement for cell selection (S516). For example, the terminal may measure received signal strengths of measurable neighbor base stations.

Based on the received signal strength of each of the neighbor base stations, the terminal may determine whether a condition for triggering a handover execution event is satisfied (S517). For example, the terminal may determine a target base station whose received signal strength is greater than or equal to the received signal strength of the serving base station by the third handover execution offset for a predetermined time by comparing the received signal strength of the serving base station with the received signal strength of each of the neighbor base stations.

At this time, the terminal may determine whether a handover command message for the determined target base station has been stored (S518). When the handover command message for the determined target base station is determined to have been stored, the terminal may execute the handover to the determined target base station (S519).

Meanwhile, the terminal may use a specific offset set by the terminal without configuring a separate handover event for the RLF state. For example, when the RLF is detected, the terminal may apply a low handover execution offset so that the handover is executed instead of performing the AS RLF recovery procedure in order to reduce the data interruption time. For example, when the RLF is detected, the terminal may execute the handover even if the received signal strength of the target base station corresponding to the stored handover command message differs from the received signal strength of the serving base station by less than 0 dB.

On the other hand, when the condition for triggering the handover execution event is not satisfied in the step S517, the terminal may perform the RLF recovery procedure (S520). Also, when the handover command message for the target base station is determined to have not been stored in the step S518, the terminal may perform the RLF recovery procedure.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a wireless communication system, the operation method comprising:
   receiving, from a serving base station, configuration information of handover events which include a handover preparation event to trigger a measurement report and a handover execution event to trigger conditional handover execution;
   performing a measurement operation with the serving base station and a plurality of neighbor base stations using the configuration information;
   determining that the handover preparation event occurs based on a result of the measurement operation;
   transmitting, to the serving base station, the measurement report including measurement information of cells of the plurality of neighbor base stations based on the determining;
   receiving, from the serving base station, a conditional handover command message for one or more candidate neighbor base stations among the plurality of neighbor base stations;
   declaring radio link failure (RLF) during a handover operation;
   selecting a first cell of a first base station by performing a cell selection operation;
   when the selected first cell belongs to cell(s) of the one or more candidate neighbor base stations associated with the conditional handover command message, performing the handover operation to the selected first cell of the first base station; and
   when the selected first cell does not belong to the cell(s) of the one or more candidate neighbor base stations associated with the conditional handover command message, performing a radio resource control (RRC) connection re-establishment procedure to the selected first cell of the first base station.

2. The operation method according to claim 1, wherein the configuration information includes a first parameter set which is used for determining whether the handover preparation event occurs and a second parameter set which is used for determining whether the handover execution event occurs.

3. The operation method according to claim 2, wherein the first parameter set includes a handover margin and a time to trigger (TTT).

4. The operation method according to claim 1, wherein when the measurement report is received in the serving base station, a handover preparation message is transmitted from the serving base station to the one or more candidate neighbor base stations.

* * * * *